Dec. 16, 1969    W. H. PRICE    3,483,684
MOUNTING LINKAGE FOR ROTARY MOWERS
Filed July 11, 1967    4 Sheets-Sheet 1

INVENTOR
WARREN H. PRICE

BY Wheeler, Wheeler, House & Clemency
ATTORNEYS

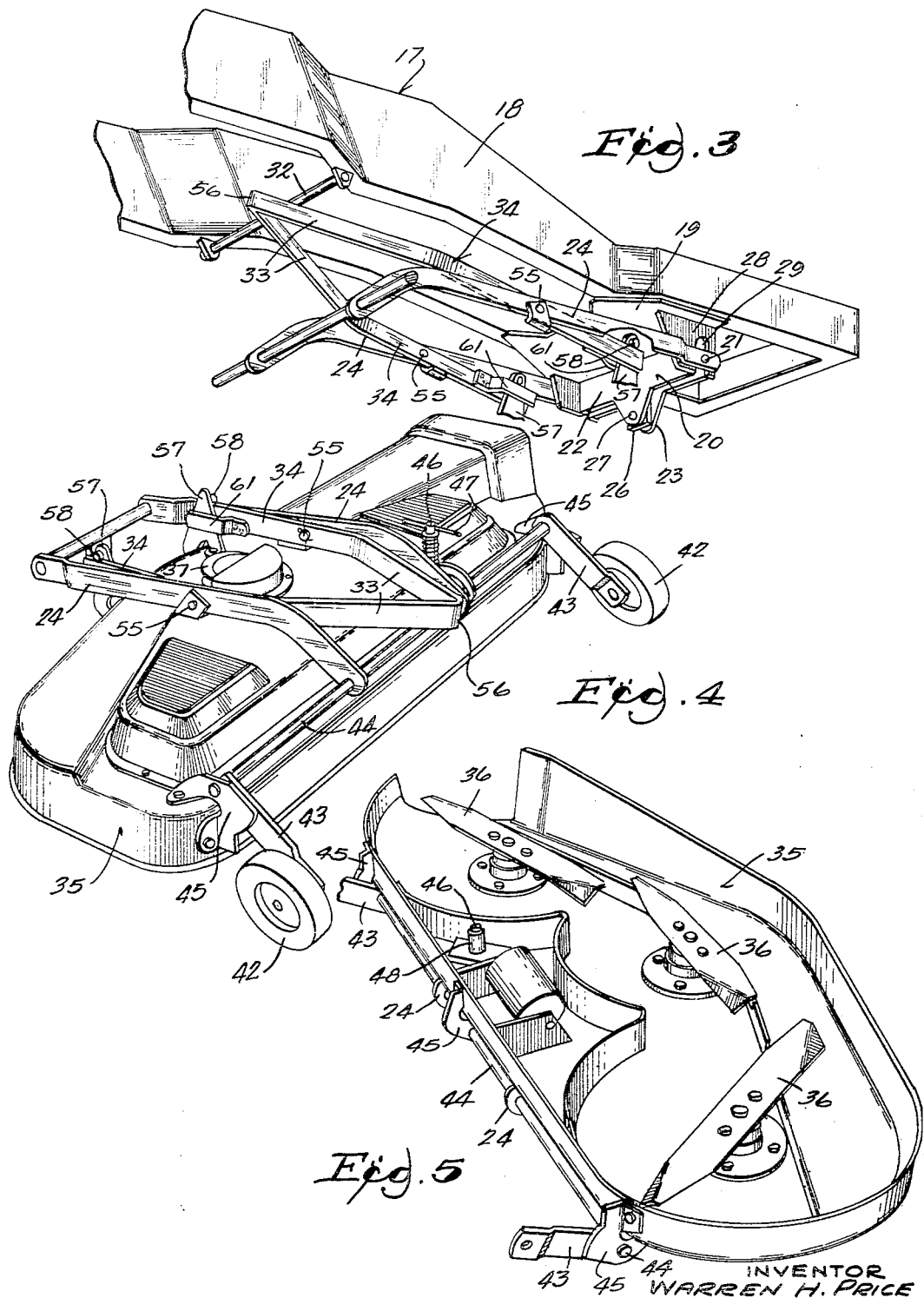

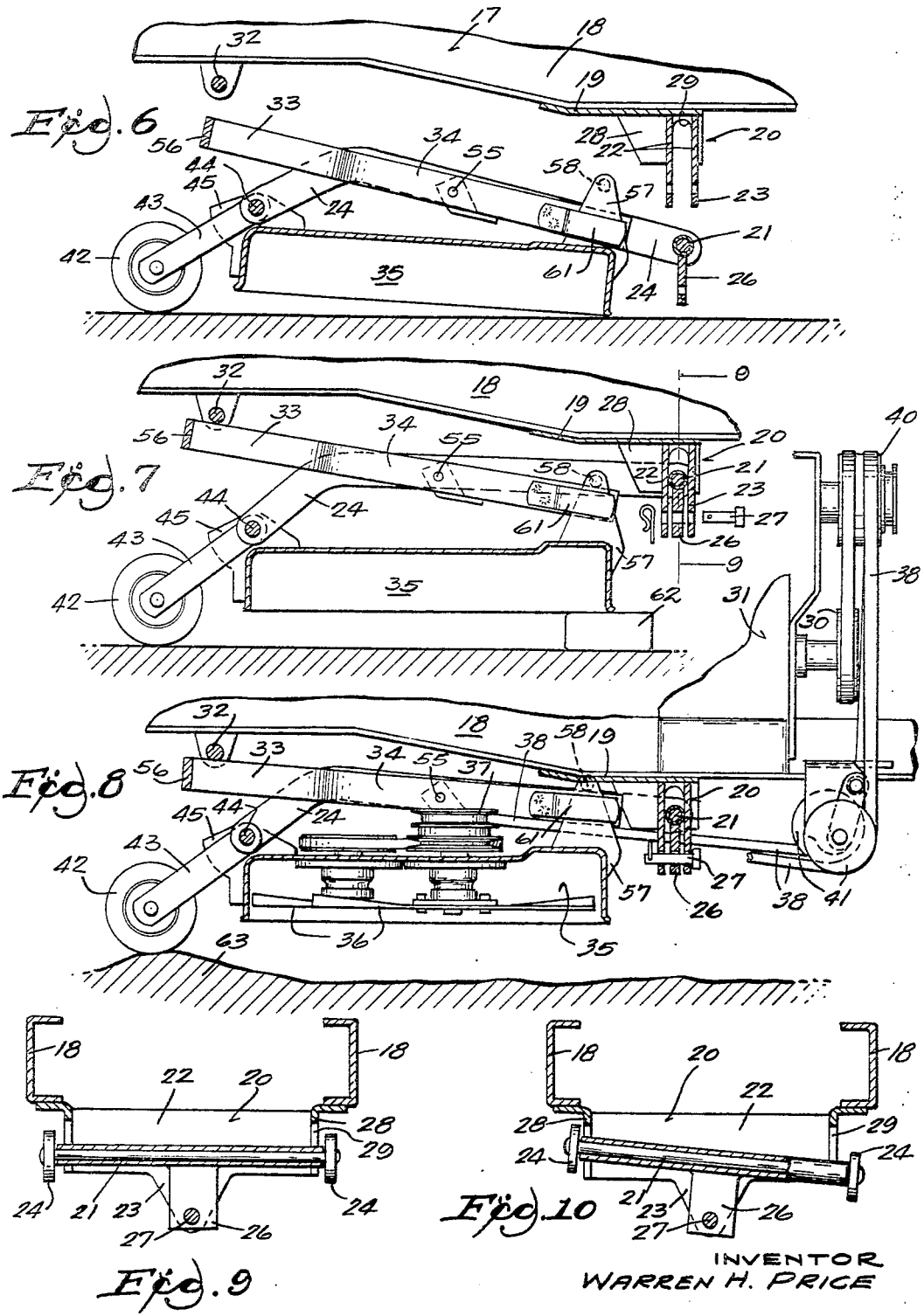

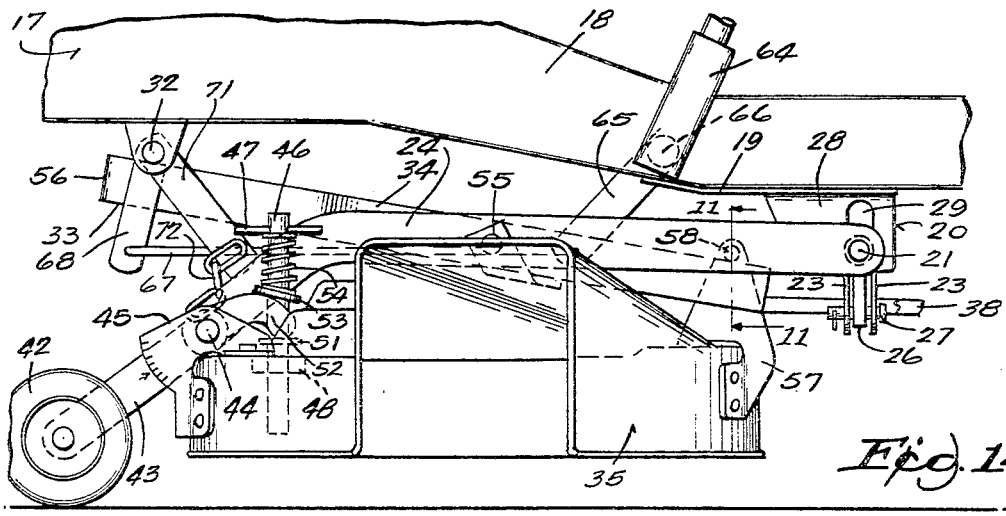
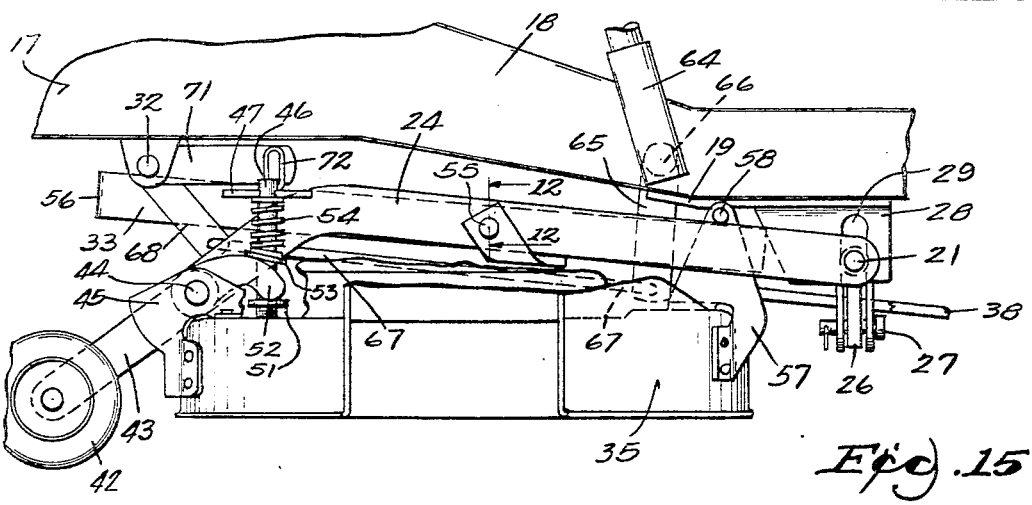
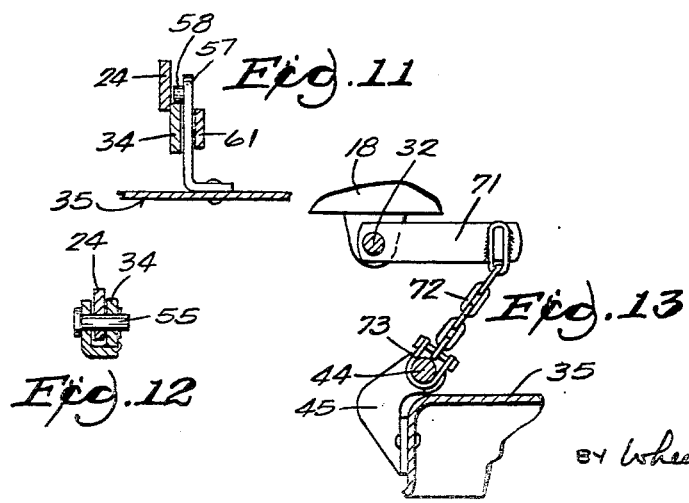
INVENTOR
WARREN H. PRICE

United States Patent Office 3,483,684
Patented Dec. 16, 1969

3,483,684
MOUNTING LINKAGE FOR ROTARY MOWERS
Warren H. Price, Sheboygan, Wis., assignor to Gilson
Bros. Co., Plymouth, Wis., a corporation of Wisconsin
Filed July 11, 1967, Ser. No. 652,567
Int. Cl. A01d 55/32, 69/16
U.S. Cl. 56—25.4                                    8 Claims

ABSTRACT OF THE DISCLOSURE

This disclosure relates to the mounting linkage of a rotary mower beneath a tractor by which the mower linkage has a single hitch point to the tractor. The linkage consists of scissors arms pivotally connected intermediate their end and coupling means respectively mounting the scissors linkage to the tractor and to the housing for substantial parallel motion of the housing with respect to the tractor.

Background of the invention

Linkage suspensions for rotary mowers beneath tractors are known. For example, one form of linkage is shown in United States Patent 3,283,486. However, such a linkage as is shown in the prior patent aforesaid is difficult to attach to the tractor. Both the tractor and the mower housing with linkage arms, etc., are heavy and awkward to manipulate by hand in the course of attaching and detaching the mower housing with respect to the tractor. Moreover, the linkage mechanism shown in the prior patent requires parts welded together in such a way as to result in a costly and inherently weak structure.

Summary of the invention

According to the present invention, the linkage is such that a single hitch point is provided between the tractor and the mower housing. This greatly simplifies the attachment of the housing to the tractor. The leveling link of scissors linkages embodying the present invention has its rear end portion in unrestrained lateral approach relation to a downwardly exposed reaction abutment on the tractor. There is no confined connection between the leveling link and the tractor. Forces generated in the course of elevating the hitch on a draw link into connection with the draw hanger near the front of the tractor swings the rear end of the leveling link upwardly against the abutment. The reaction force of gravity on the housing will thereafter maintain it in such position without any need for a confined connection between this link and the tractor. This feature greatly simplifies the task of mounting and demounting the mower housing with respect to the tractor.

The linkage structure disclosed herein is greatly improved and simplified as compared to the one shown in the prior patent aforesaid. The leveling link is part of a scissors linkage extending in one continuous piece from an articulate connection to the rear end of the mower housing past a pivotal connection with the draw link to a rear end portion in unrestrained lateral contact with the tractor abutment. In preferred embodiments, the leveling link consists of side arms having converging rear end portions which are in lateral engagement with an abutment cross bar on the tractor.

The front end of the draw link has a single hitch point articulate connection to a hanger bracket on which the mower may tilt laterally. The mower is provided with rear end wheels to follow the contour of the ground and to transmit ground pressure to the scissors link to float the housing into parallel relation to the tractor. Accordingly, the mower housing may tilt laterally but will have a parallel rising and falling motion on its longitudinal axis.

Other objects, features and advantages of the invention will appear from the following disclosure.

Description of the drawings

FIG. 3 is a bottom perspective view showing the tractor frame and the scissors linkage, the mower housing being omitted in this view.

FIG. 4 is a perspective view showing the mower housing and scissors linkage, the tractor being omitted from this view.

FIG. 5 is an inverted perspective view of the mower housing.

FIG. 6 is a fragmentary side elevation showing the mower housing beneath the tractor and before it is elevated to connect the draft link to the tractor hanger on the single hitch point.

FIG. 7 is a view similar to FIG. 6 but showing the mower housing elevated into its connected position.

FIG. 8 is a view similar to FIGS. 6 and 7 but showing the tractor in use and in which the wheels of the housing have ridden up on a ground hump.

FIG. 9 is a fragmentary cross section taken along the line 9—9 of FIG. 7.

FIG. 10 is a view similar to FIG. 9 but showing the mower housing tilted laterally.

FIG. 11 is a fragmentary cross section taken along the line 11—11 of FIG. 14.

FIG. 12 is a fragmentary cross section taken along the line 12—12 of FIG. 15.

FIG. 13 is a fragmentary vertical cross section showing details of the lift mechanism.

FIG. 14 is a fragmentary side elevation showing the mower lift in its down position.

FIG. 15 is a view similar to FIG. 14, but showing the mower lift in its up position.

Description of the preferred embodiment

Figure 1:
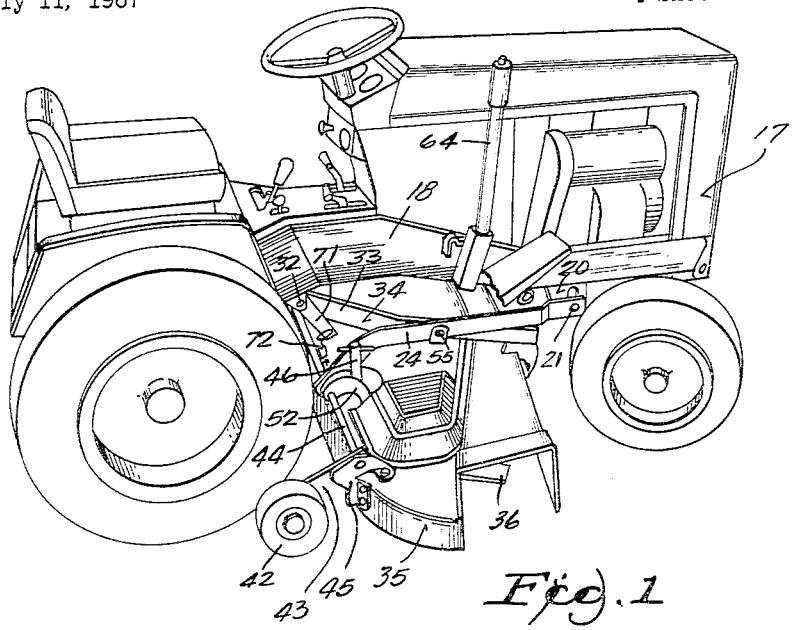
FIG. 1 is a perspective view of a tractor and mower housing suspended from the tractor on linkages embodying the present invention.
Figure 2:
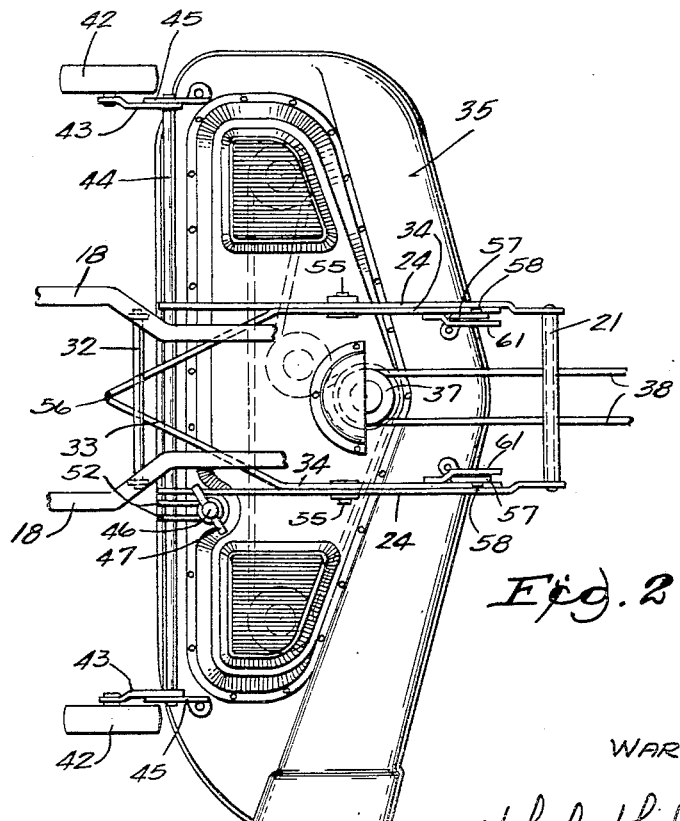
FIG. 2 is a plan view of the mower housing and suspension linkage and a portion only of the framework of the tractor.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The tractor 17 may be of any appropriate construction. In the disclosed embodiment, it has a frame 18 with a flat front cross plate 19 to the under surface of which depending hanger bracket 20 is attached as by welding. The hanger bracket 20 consists of longitudinally spaced fore and aft plates 22 which provide a laterally elongated socket receiving the cross bar or tube 21 of the hitch coupling on the forward ends of the draft links 24 of the suspension linkage. As best shown in FIG. 9, the plates 22 on the hanger bracket 20 are provided with corresponding downwardly projecting ears 23 between which the hitch tab 26 on the cross rod 21 is received. A longitudinally extending pivot pin 27 pivotally mounts tab 26 between the ears 23. This provides for lateral tilt or rocking movement of the mower, as is indicated in FIG. 10. Hanger 20 also has side plates 28 with vertical slots 29 aligned with the socket space between plates 22 and in which the cross rod 21 plays during any rocking movement of the motor housing. Hanger bracket 20 provides broad areas of thrust contact with the draw rod 21 and relieves pin 27 from stress to facilitate the rocking movement aforesaid.

Near its rear end, tractor frame 18 is provided with a cross rod 32 which provides an abutment, the approach to which is laterally exposed beneath the tractor and against which abut the converging rear ends 33 of the leveling link arms 34 of the suspension linkage.

The mower housing 35 is transversely elongated and typically contains three rotary cutter bars 36 all driven from a pulley 37 by a drive belt 38 which extends forwardly of the hanger bracket 20 and passes around idler pulleys 41 and thence upwardly, as shown in FIG. 8, about a pulley 40 on the power takeoff 30 from the tractor engine 31. One of the pulleys 41 is desirably spring loaded to maintain tension in the belt 38.

At its rear end, mower housing 35 is provided with ground support means such as wheels 42 which are respectively mounted on swing lever arms 43 which have their ends fast to an axle shaft 44. The ends of shaft 44 are journaled in laterally spaced brackets 45 mounted on the rear edge and near the ends of the housing 35.

The height at which wheels 42 support the housing 35 is adjusted by an adjuster screw 46 which has a handle 47 by which the screw can be turned in its threaded block 48 fastened to the under surface of housing 35, as shown in FIG. 5, and in phantom in FIG. 14. Adjusting screw 46 carries a thrust collar 51 which bears beneath one end of the bifurcated crank 52, the other end of which is fast to the axle 44 at a point intermediate brackets 45. Any swinging movement imparted to crank 52 is transmitted to axle 44 and then to both wheels 42 to concurrently change their height relation to the housing 35. Screw 46 is also provided at the other side of the end of crank 52 with a traveling collar 53 loosely encircling the screw 46 and biased by the pressure of coil spring 54 against the top of the crank 52. The operator may adjust the height at which the wheels support the mower housing 35 by turning the screw 46.

The suspension linkage is made up of the draw links 24 and the leveling links 34. Each link consists of a pair of laterally spaced arms. These arms are pivotally connected intermediate their ends on the scissors link pins 55. Each of the arms 24, 34 is continuous from one end of the link to the other for simplicity and strength. The rear ends of the leveling link arms 34 are bent toward one another to provide converging end portions 33 which are interconnected at an apex 56 disposed substantially on the medial longitudinal centerline of the tractor.

The forward ends of the leveling links 34 have articulated couplings to the forward edge of the mower housing 35. The forward edge of the mower housing has a pair of spaced, upstanding brackets 57 from the tops of which thrust lift pegs 58 project laterally. Pegs 58 overlie the top edges of the front ends of leveling links 34. Links 34 are maintained beneath the pegs 58 by the guide fingers 61 welded to the inside faces of the links 34 to embrace the brackets 57, as shown in FIGS. 3 and 4. As the scissors linkage 24, 34 pivots about pins 55, the arms 34 will have a slight sliding movement beneath the pegs 58.

The ease by which the mower housing is mounted on the tractor is illustrated in FIGS. 6 and 7. FIG. 6 shows the mower housing detached from the tractor and resting on a hard surface such as a driveway apron, etc. The mower can be positioned by hand beneath the tractor so that the hitch socket of tractor hanger bracket 20 is aligned vertically with the hitch bar 21 at the front end of the draw links 24. In this position, the scissors linkage is closed. Accordingly, the rear ends of the leveling links 34 are considerably below the level of the abutment cross bar 32 on the tractor frame. The operator now lifts the front end of the mower housing and props it up with a block 62 (FIG. 7), thus to more closely align hitch bar 21 and tractor hanger bracket 20. The operator now lifts the linkage to open the scissors somewhat and inserts the bar 21 into the hanger socket and inserts coupling pin 27, as shown in FIG. 7. As the scissors linkage opens to its position shown in FIG. 7, the rear end 33 of the leveling linkage 34 will rise to a level of contact with the cross abutment bar 32 on the frame 18, as is also shown in FIG. 7. Block 62 is now removed.

By the foregoing procedure the mower has been coupled to the tractor on a single hitch point. It is unnecessary to make any restrained connection between the rear end of the leveling link 34 and the tractor. Downward gravity bias on the housing 35 is such to maintain an upward bias on the rear end of the linkage 34 against the abutment bar 32. The mower is uncoupled from the tractor in the reverse order of the above described coupling sequence.

Because of the scissors configuration of the linkage 24, 34, the housing 35 is constrained to have a parallel motion upwardly with respect to the frame 18. For example, if a rear wheel 42 travels over a ground hump 63, as shown in FIG. 8, the rear end of the housing 35 will lift. This lifting force will be transmitted through the scissors linkage to impose a similar upward thrust on the brackets 57 at the front edge of the housing, thus to lift the front of the housing and require the housing to move up and down in parallel relation to the frame of the tractor.

If the respective wheels 42 are lifted unequally, or one wheel descends into a valley, the housing is free to tilt laterally about the pin 27, as indicated in FIG. 10. Accordingly, the mover housing is suspended for non-scalping floating relationship with respect to the ground and the tractor. Lateral accommodation involves tilting about a pivot. Longitudinal accommodation involves parallel up and down motion.

A lever 64 is also provided to lift the entire mower housing to an elevated transport position in which it is well clear of the ground. Lever 64 is fast to a shaft 66 having a crank arm 65. The end of the lever 65 is connected by a link 67 to arm 68 of a bell crank which is pivoted on the rod 32 and has another arm 71 from which a chain 72 depends, as shown in FIG. 13. Chain 72 is coupled by a clevis 73 to the axle 44 on the mower housing 35.

Accordingly, drawing back on the lever 64 will actuate the bell crank arm 71 through the linkage mechanism just described, to lift upwardly on the chain 72 and lift the housing to a transport position well clear of the ground. FIG. 14 shows the lever swung forwardly to the down position of the housing. FIG. 15 shows the lever pulled back to lift the housing to transport position.

As is clear from FIG. 14, pintle 27 is disposed in substantially the same plane as belt 38. This relation minimizes belt misalignment during lateral tilt and parallel float.

I claim:

1. In the combination of a tractor, a mower housing beneath the tractor, a mower housing suspension linkage including a draw link, a leveling link and a coupling means respecting mounting the suspension linkage to the tractor and to the housing for substantial parallel motion of the housing with respect to the tractor, the improvement in said suspension linkage and said coupling means comprising:

a hanger bracket near the front end of the tractor,
   a draw coupling at the front end of the draw link,
   a single hitch point articulate connection between the hanger bracket and draw coupling and including a pivot pin on the longitudinal axis of the tractor on which the mower housing is free to tilt laterally,
   an articulate connection between the rear end of the draw link and the rear end of the mower housing,
   a downwardly exposed abutment on the tractor spaced rearwardly from said hanger bracket,
   said leveling link having a front end coupled in lift relation to the front end of the mower housing and a rear end portion in unrestrained lateral approach relation to said abutment.

2. The improvement of claim 1 in which said draw link and leveling link comprise elements of a scissors linkage mutually pivotally connected intermediate the ends of the respective links.

3. The improvement of claim 2 in which the leveling link comprises laterally spaced arms extending continuously in one piece from front to rear ends thereof, said rear ends converging and connected together at substantially the medial centerline of the tractor.

4. The improvement of claim 1 in which the housing is provided at its rear end with wheels and an axle about which said wheels may swing, said draw link being pivotally connected to said axle.

5. The improvement of claim 1 in which said tractor is provided with a housing lift connected to said axle.

6. The improvement of claim 1 in which said hanger bracket is offset rearwardly from the front end of the tractor, said mower housing having blades therein and a belt drive for said blades extending forwardly of said hanger, said tractor having a power takeoff with a pulley and idler pulleys ahead of said hanger, beneath the power takeoff pulley and about which said belt is trained.

7. The improvement of claim 1 in which the housing is provided at its rear end with wheels and an axle about which said wheels may swing, said draw link being pivotally connected to said axle, and a height adjuster comprising a crank arm on said axle and a screw adjuster for said crank arm.

8. The improvement of claim 1 in which the front end of the mower is provided with an upstanding bracket having a laterally projecting lift peg beneath which the front end of the leveling link is disposed for relative sliding movement between the link and peg.

References Cited

UNITED STATES PATENTS

| 3,063,226 | 11/1962 | Pfauser | 56—25.4 |
| 3,245,209 | 4/1966 | Marek | 56—25.4 |
| 3,269,100 | 8/1966 | Smith | 56—25.4 |

LOUIS G. MANCENE, Primary Examiner

R. F. CUTTING, Assistant Examiner